United States Patent
Naor et al.

(10) Patent No.: US 10,360,030 B2
(45) Date of Patent: *Jul. 23, 2019

(54) EFFICIENT POINTER LOAD AND FORMAT

(71) Applicant: International Business Machines Corporation, Armonk, NY (US)

(72) Inventors: Eyal Naor, Tel-Aviv (IL); Martin Recktenwald, Schoenaich (DE); Christian Zoellin, Weinstadt (DE); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,297

(22) Filed: Dec. 20, 2017

(65) Prior Publication Data

US 2019/0018682 A1    Jan. 17, 2019

Related U.S. Application Data

(63) Continuation of application No. 15/647,649, filed on Jul. 12, 2017.

(51) Int. Cl.
*G06F 9/30* (2018.01)
*G06F 9/22* (2006.01)

(52) U.S. Cl.
CPC .......... *G06F 9/30032* (2013.01); *G06F 9/226* (2013.01)

(58) Field of Classification Search
None
See application file for complete search history.

(56) References Cited

U.S. PATENT DOCUMENTS

| 5,649,225 | A | 7/1997 | White et al. |
|---|---|---|---|
| 5,659,782 | A | 8/1997 | Senter et al. |
| 6,044,447 | A | 3/2000 | Averill et al. |
| 6,725,358 | B1 * | 4/2004 | Moore ................. G06F 9/3004 712/216 |
| 6,854,049 | B2 | 2/2005 | Cofler |
| 9,075,735 | B2 | 7/2015 | Tomlinson et al. |
| 9,244,686 | B2 | 1/2016 | Henry et al. |

(Continued)

FOREIGN PATENT DOCUMENTS

EP    1050803    1/2007

OTHER PUBLICATIONS

Wetzel, "PowerPC Virtual Environment Architecture," Book II, Version 2.01, https://cseweb.ucsd.edu/classes/wi07/cse240b/Assignments/es-archpub2.pdf, Dec. 2003, 61 pgs.

(Continued)

Primary Examiner — John M Lindlof
(74) Attorney, Agent, or Firm — Scott S. Dobson (57) ABSTRACT

Embodiments of the present disclosure relate to processing a microprocessor instruction by receiving a microprocessor instruction for processing by a microprocessor, and processing the microprocessor instruction in a multi-cycle operation by acquiring a unit of data having a plurality of ordered bits, where the acquiring is performed by the microprocessor during a first clock cycle, and shifting the unit of data by a number of bits, where the shifting is performed by the microprocessor during a second clock cycle subsequent to the first clock cycle.

5 Claims, 4 Drawing Sheets

(56) References Cited

U.S. PATENT DOCUMENTS

| | | | |
|---|---|---|---|
| 9,747,203 B2 | 8/2017 | Frazier et al. | |
| 9,747,204 B2 | 8/2017 | Frazier et al. | |
| 2005/0055543 A1 | 3/2005 | Moyer | |
| 2009/0119321 A1* | 5/2009 | Mitran | G06F 9/30043 |
| 2012/0102284 A1 | 4/2012 | Odaira | |
| 2012/0204012 A1 | 8/2012 | Moyer et al. | |
| 2013/0046957 A1 | 2/2013 | Tran et al. | |
| 2013/0346719 A1 | 12/2013 | Tomlinson et al. | |
| 2014/0122847 A1 | 5/2014 | Henry et al. | |
| 2015/0100767 A1* | 4/2015 | Topham | G06F 9/30192 |
| | | | 712/226 |
| 2017/0004072 A1 | 1/2017 | Frazier et al. | |
| 2017/0004073 A1 | 1/2017 | Frazier et al. | |
| 2017/0004074 A1 | 1/2017 | Frazier et al. | |
| 2017/0031812 A1 | 2/2017 | Frazier et al. | |
| 2017/0031813 A1 | 2/2017 | Frazier et al. | |
| 2017/0060586 A1* | 3/2017 | Lingam | G06F 9/30032 |

OTHER PUBLICATIONS

Greiner et al., "Load Logical and Shift Guarded Instruction," U.S. Appl. No. 15/409,684, filed Jan. 19, 2017.

Naor et al., "Efficient Pointer Load and Format," U.S. Appl. No. 15/647,649, filed Jul. 12, 2017.

Naor et al., "Efficient Pointer Load and Format," U.S. Appl. No. 15/848,353, filed Dec. 20, 2017.

List of IBM Patents or Patent Applications Treated as Related, dated Dec. 19, 2017, 2 pages.

Accelerated Examination Support Document, dated Dec. 18, 2017, 14 pages.

\* cited by examiner

EFFICIENT POINTER LOAD AND FORMAT

BACKGROUND

The present disclosure relates generally to the field of processors, and more particularly to microprocessor architecture design.

Some microprocessor architectures support individual instructions that require loading a pointer from memory and manipulating the loaded data. One such example involves a condensed pointer in which a known boundary is considered, and therefore the pointer is kept in memory without its least significant zeros. After loading the pointer, it is left-shifted to restore the actual address. Thus, where a 32-bit pointer is used in a 64-bit processor, 64 bits are loaded from cache memory, whereupon the most significant 32 bits are zeroed to produce a 32-bit pointer.

SUMMARY

In one aspect of the present disclosure, a method is provided for processing a microprocessor instruction, the method including receiving a microprocessor instruction for processing by a microprocessor, and processing the microprocessor instruction in a multi-cycle operation by acquiring a unit of data having a plurality of ordered bits, where the acquiring is performed by the microprocessor during a first clock cycle, and shifting the unit of data by a number of bits, where the shifting is performed by the microprocessor during a second clock cycle subsequent to the first clock cycle.

In other aspects of the present disclosure, systems and computer program products for processing a microprocessor instruction are provided. The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Some microprocessor architectures support individual instructions that require loading a pointer from memory and manipulating the loaded data. One such example involves a condensed pointer in which a known boundary is considered, and therefore the pointer is kept in memory without its least significant zeros. After loading the pointer, it is left-shifted to restore the actual address. In another example, part of an address is set to zero to accommodate a particular addressing mode. Thus, where a 32-bit pointer is used in a 64-bit processor, 64 bits are loaded from cache memory, whereupon the most significant 32 bits are zeroed to produce a 32-bit pointer. Such integer manipulations are usually performed by the microprocessor's Integer Execution Unit after receiving the raw data from a separate Load/Store Unit. However, this is inefficient, as it requires sending the data from the Load/Store Unit to the Integer Execution Unit and then back to the Load/Store Unit to actually use the pointer.

Embodiments of the present disclosure include a method of processing data in a two-cycle (e.g., or multi-cycle) operation. Some load instructions are issued with an extra cycle to load double the amount of data or cache-line crossing data. Contrary to these two-cycle operations, embodiments of the present disclosure may not load extra data on the second cycle, and instead, may utilize the second cycle to shift the data.

Figure 1A:
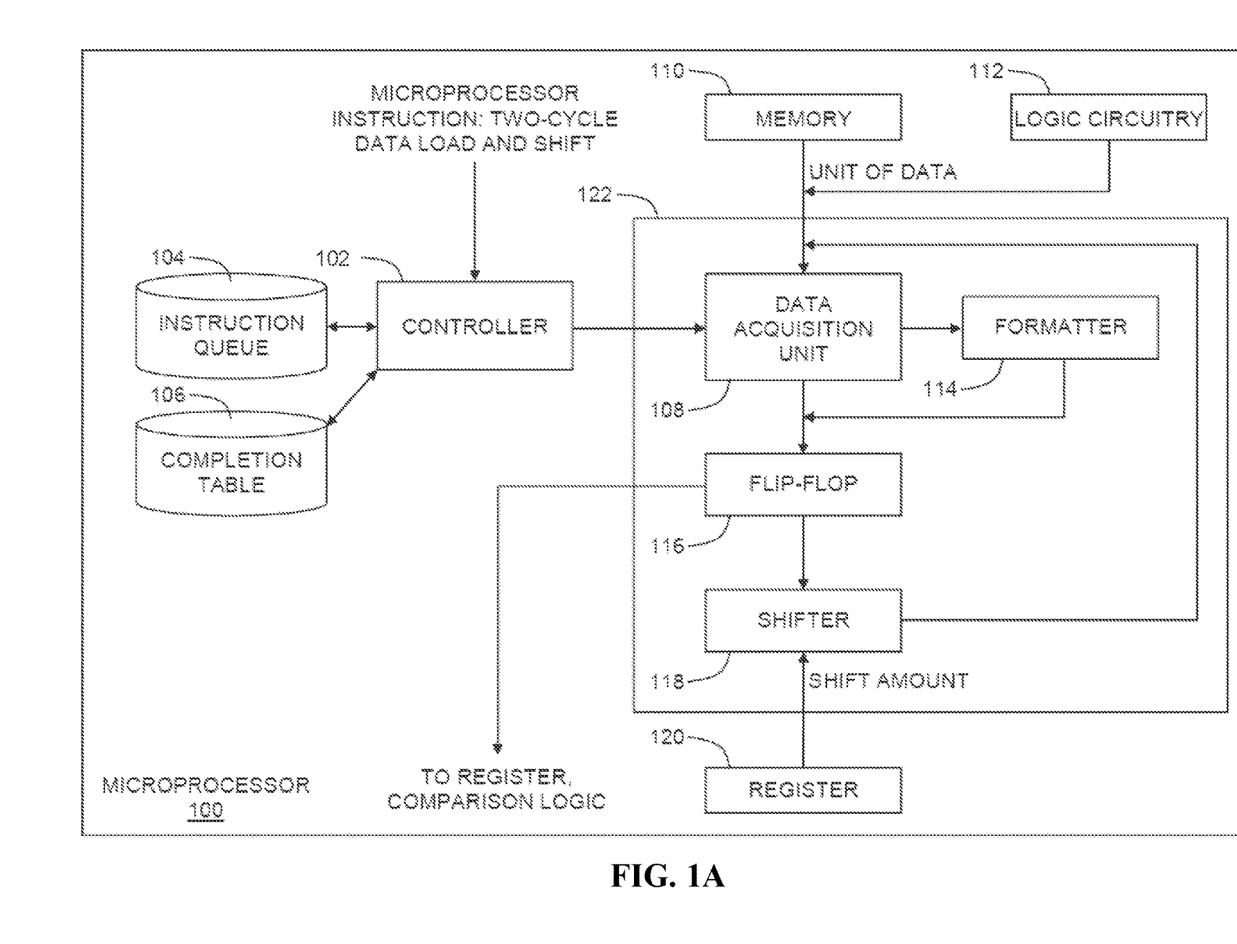
FIG. 1A is a simplified conceptual illustration of a system for processing a microprocessor instruction, in accordance with embodiments of the present disclosure.

Reference is now made to FIG. 1A, which is a simplified conceptual illustration of a system for processing a microprocessor instruction, in accordance with embodiments of the present disclosure. In the system of FIG. 1A, a microprocessor 100 is shown, where microprocessor 100 is configured in accordance with any microprocessor architecture to process microprocessor instructions, including known types of single microprocessor instructions that are processed in multiple cycles, such as two-cycle operations. In accordance with embodiments of the present disclosure, microprocessor 100 is also configured, such as is shown and described herein, to process, in multiple cycles, microprocessor instructions that require data to be acquired and then bit-shifted.

In the system of FIG. 1A, a controller 102 is configured to receive a microprocessor instruction for processing by microprocessor 100, where the microprocessor instruction is a single instruction that is to be processed in multiple cycles, and where the microprocessor instruction requires data to be acquired and then bit-shifted. Controller 102 may be configured to maintain the microprocessor instruction as a single instruction in an instruction queue 104 until the microprocessor instruction is removed by controller 102 from instruction queue 104 for processing by microprocessor 100. Controller 102 may also be configured to maintain the microprocessor instruction as a single instruction in a completion table 106 during processing of the microprocessor instruction by microprocessor 100, where controller 102 removes the microprocessor instruction from completion table 106 after the processing of the microprocessor instruction by microprocessor 100 has been completed. In some embodiments, if the microprocessor instruction is corrupted or cleared during processing, the controller 102 may be configured to retrieve the microprocessor instruction from the completion table 106.

A data acquisition unit 108 is configured to process the microprocessor instruction by acquiring, during a first clock cycle of microprocessor 100, a unit of data having a predefined number of ordered bits, such as 64 bits. In some embodiments, data acquisition unit 108 is configured to acquire the unit of data from memory 110, such as cache memory of microprocessor 100. In some embodiments, data acquisition unit 108 is configured to acquire the unit of data by receiving the unit of data from logic circuitry 112 of microprocessor 100.

In some embodiments, the system of FIG. 1A includes a formatter 114 configured to zero any of the bits of the unit of data as may be required for processing the microprocessor instruction, after the unit of data is acquired by data acquisition unit 108 and during the same clock cycle in which the unit of data is acquired by data acquisition unit 108 or during a later clock cycle.

A flip-flop 116 is configured to receive the unit of data as acquired by data acquisition unit 108, or as processed by formatter 114, such as at the end of the first clock cycle or thereafter.

A shifter 118 is configured to shift the unit of data by a number of bits as may be required for processing the microprocessor instruction, such as where the number of bits are indicated in a register 120 that is accessible to shifter 118. Shifter 118 is configured to perform the shift of the unit of data during a second clock cycle of microprocessor 100, where the second clock cycle immediately follows the aforementioned first clock cycle or where the second clock cycle is a later clock cycle that is otherwise subsequent to the aforementioned first clock cycle.

Formatter 114 is configured to zero any of the bits of the unit of data as may be required for processing the microprocessor instruction, which may be done during the second clock cycle after the unit of data is shifted by shifter 118. Such zeroing of bits may, for example, be performed by formatter 114 to zero any bits that are not required for use with a predefined addressing mode, such as where a unit of data of 64 bits is acquired by data acquisition unit 108 for use with a 24-bit addressing mode, in which case 40 of the 64 bits are zeroed by formatter 114.

After the unit of data are acquired and formatted during the first clock cycle, and subsequently shifted and formatted during the second clock cycle, flip-flop 116 places the unit of data into a register of microprocessor 100 and/or provides the unit of data to comparison logic of microprocessor 100, such as at the end of the second clock cycle or thereafter.

In some embodiments, data acquisition unit 108, formatter 114, flip-flop 116, and shifter 118 are embodied in a load-store unit 122 of microprocessor 100.

Any of the elements shown in FIG. 1A may be implemented in computer hardware and/or in computer software embodied in a non-transitory, computer-readable medium. For example, the elements shown in FIG. 1A may be implemented in the computer system depicted in FIG. 3. Further, one or more of the elements of FIG. 1A may be optional. For example, formatter 114 may be optionally included in some embodiments, as zeroing bits of the unit of data may not be required. Additionally, each of the elements of FIG. 1A may be configured to perform all, some, or none of the operations described herein with respect to the particular element, and one or more of the elements may be configured to perform the operations of one or more other elements. For example, data acquisition unit 108 may be configured to perform the functions of formatter 114.

Figure 1B:
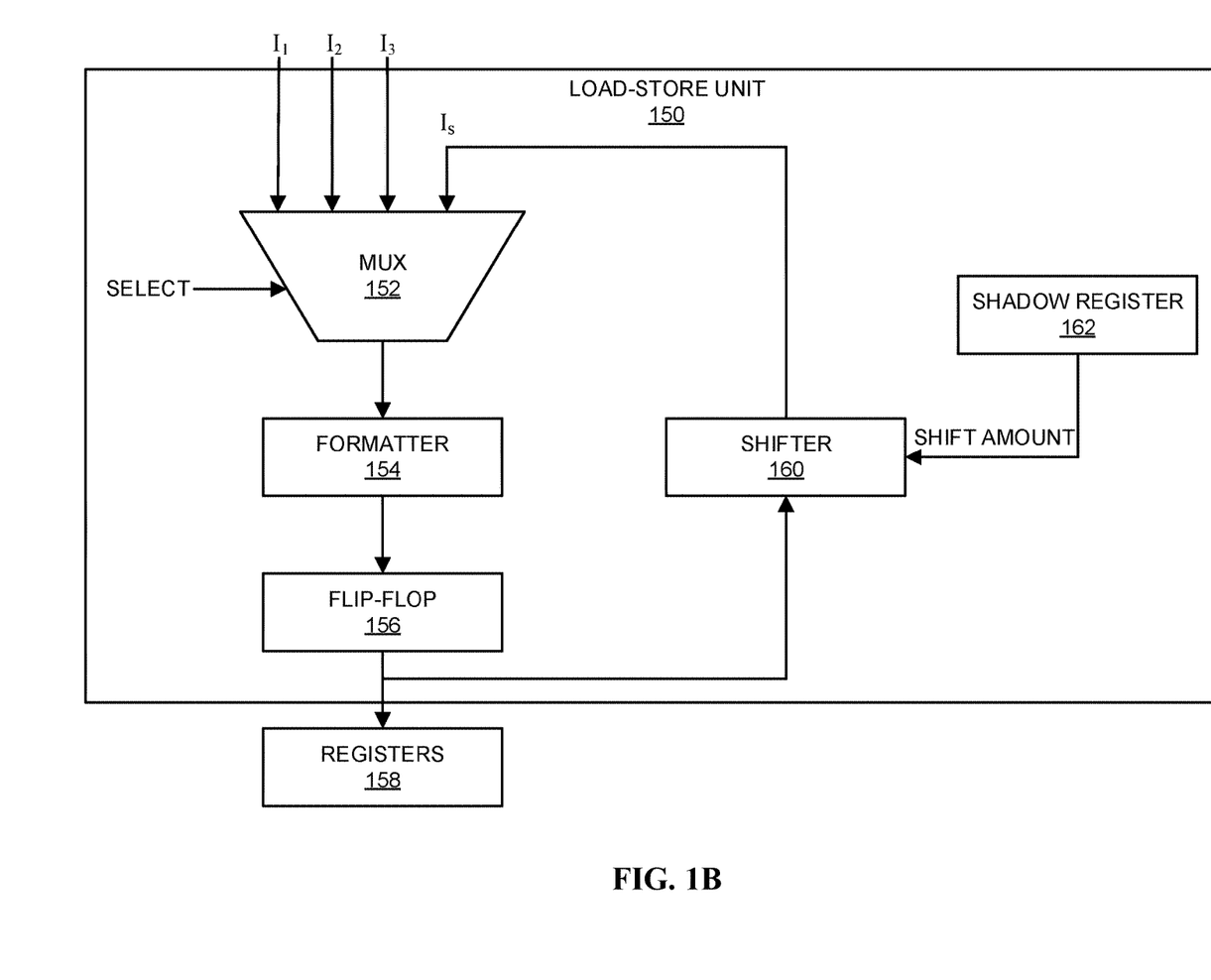
FIG. 1B is a simplified conceptual illustration of a load-store unit, in accordance with embodiments of the present disclosure.

Referring now to FIG. 1B, shown is an example load-store unit 150 architecture for processing an input signal in a multi-cycle operation, in accordance with embodiments of the present disclosure. The components described in FIG. 1B may be substantially similar to, or alternatively, different than, components described in FIG. 1A. For example, in some embodiments, formatter 114 of FIG. 1A may be substantially similar to formatter 154 of FIG. 1B. However, in some embodiments, formatter 114 of FIG. 1A may be substantially different than (e.g., may include different circuitry or logic) than formatter 154 of FIG. 1B.

As depicted in FIG. 1B, one or more input signals (e.g., $I_1$, $I_2$, $I_3$) may be received by a Multiplexer (MUX) 152 of the load-store unit 150. The one or more input signals may be received from cache banks, processing units (e.g., arithmetic logic units (ALUs)), registers, and/or controllers of a microprocessor, depending on the architecture of the microprocessor. For example, input signals $I_1$ and $I_2$ may be received from cache banks of the microprocessor (e.g., memory 110 in FIG. 1A) and input signal $I_3$ may be received as forwarded by logical circuitry of the microprocessor (e.g., logic circuitry 112 in FIG. 1A). In some embodiments, input signals from cache banks may be accessed speculatively based on a subset of the addresses for faster address generation. In these embodiments, if the address speculation is wrong, the data may be output with a reject signal to prevent the wrong data from being loaded into the MUX 152. In some embodiments, the one or more signals may correspond to pointers used to reference other data. A select signal may be transmitted to the MUX 152 to select an input signal for processing. The selected input signal may then be forwarded to a formatter 154. The formatter 154 may perform various alignment operations, including zeroing relevant bits of data according to an addressing mode. In some embodiments, the formatter 154 may zero bits of data of corresponding to a pointer. For example, if an input signal is a 32-bit pointer which is intended for a 24-bit addressing mode, the formatter 154 may zero 8 bits of data (e.g., the 8 most significant bits) of the selected pointer. This may allow the pointer to be compatible with the specific addressing mode. In some embodiments, the formatter 154 may format the selected input signal on a first clock cycle.

After the input signal is processed (e.g., zeroed) by the formatter 154, it may be forwarded to a flip-flop 156 of the load-store unit 150. The input signal may then be transferred from the flip-flop 156 to a shifter 160. The shifter 160 may bit shift the input signal by any number of bits as indicated by a shadow register 162. In some embodiments, the shifter 160 may receive the input signal at the end of a first clock cycle, and shift the input signal during a second clock cycle. Alternatively, in some embodiments the shifter 160 may receive and shift the input signal on the second clock cycle. Bit-shifting may include shifting bits of the input signal left or right, and may depend on control fields indicated in the shadow register 162. The shadow register 162 may be a copy of main control registers of the microprocessor, and may issue a shift amount in order to format the input signal to be processed.

After the shifter 160 shifts bits of the input signal according to the shift amount indicated by the shadow register 162, the input signal may be transferred back to the MUX 152. In some embodiments, after the shift is performed, some of the zeroed bits may require re-zeroing. Accordingly, the shifted signal, $I_s$, may then be selected by the MUX 152 to be re-processed by the formatter 154. The formatter 154 may then re-zero the shifted input signal, and forward the shifted data onto the flip-flop 156 and ultimately to registers 158 of the microprocessor. Re-zeroing the input signal may, in some embodiments, reduce the required size of the shifter 160. In some embodiments, the shifted signal, $I_s$, may be forwarded to the registers 158 during the second clock cycle immediately subsequent to the first clock cycle.

Any of the elements shown in FIG. 1B may be implemented in computer hardware and/or in computer software embodied in a non-transitory, computer-readable medium. For example, the elements shown in FIG. 1B may be implemented in the computer system depicted in FIG. 3. Further, one or more of the elements of FIG. 1B may be optional. For example, formatter 154 may be optionally included in some embodiments, as zeroing bits of the unit of data may not be required. Additionally, each of the elements of FIG. 1B may be configured to perform all, some, or none of the operations described herein with respect to the particular element, and one or more of the elements may be configured to perform the operations of one or more other elements.

Figure 2:
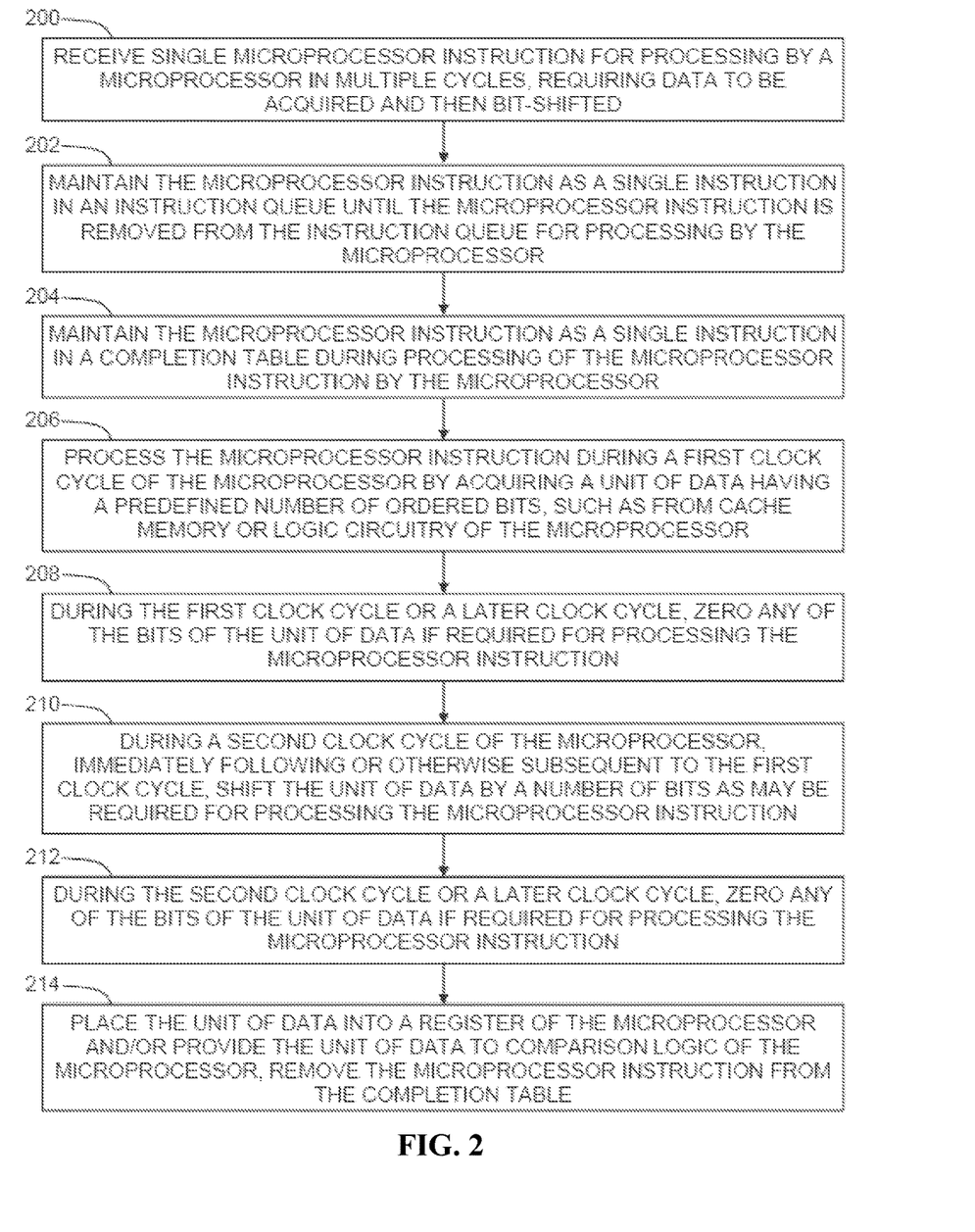
FIG. 2 is a simplified flowchart illustration of an exemplary method of processing a microprocessor instruction, in accordance with embodiments of the present disclosure.

Reference is now made to FIG. 2, which is a simplified flowchart illustration of an exemplary method of operation of the systems of FIG. 1A and FIG. 1B, in accordance with embodiments of the present disclosure. In the method of FIG. 2, a microprocessor instruction is received for processing by a microprocessor, where the microprocessor instruction is a single instruction that is to be processed in multiple cycles, and where the microprocessor instruction requires data to be acquired and then bit-shifted (operation 200). The microprocessor instruction is maintained as a single instruction in an instruction queue until the microprocessor instruction is removed from the instruction queue for processing by the microprocessor (operation 202), whereupon the microprocessor instruction is maintained as a single instruction in a completion table during processing of the microprocessor instruction by the microprocessor (operation 204). The microprocessor instruction is processed during a first clock cycle of the microprocessor by acquiring a unit of data having a predefined number of ordered bits, such as from cache memory or logic circuitry of the microprocessor (operation 206). During the first clock cycle or a later clock cycle, any of the bits of the unit of data are zeroed if required for processing the microprocessor instruction (operation 208). During a second clock cycle of the microprocessor, immediately following or otherwise subsequent to the first clock cycle, the unit of data is shifted by a number of bits as may be required for processing the microprocessor instruction (operation 210). During the second clock cycle or a later clock cycle, any of the bits of the unit of data are zeroed if required for processing the microprocessor instruction (operation 212). The unit of data is then placed into a register of the microprocessor and/or provided to comparison logic of the microprocessor, and the microprocessor instruction is removed from the completion table (operation 214).

It will be appreciated that microprocessor architectures that support processing individual instructions in multiple clock cycles, such as so-called "two-cycle operations" where data are loaded during each of two cycles, may be adapted to carry out the embodiments of the present disclosure as described herein to support other types of multi-cycle operations. For example, a single, two-cycle operation, may be supported where during a first clock cycle the raw data of a pointer is loaded, and where during a subsequent clock cycle the pointer is shifted and the most significant bits of the pointer are zeroed to accommodate a particular addressing mode, where the processing of both clock cycles are performed by a load/store unit, allowing the pointer to be provided sooner and more efficiently than with existing microprocessor architectures.

The aforementioned operations may be completed in any order and are not limited to those described. Additionally, some, all, or none of the aforementioned operations may be completed, while still remaining within the spirit and scope of the present invention. For example, in some embodiments, operation 210 may not be completed, as the unit of data may not require bit-shifting to be executed or otherwise processed.

Figure 3:
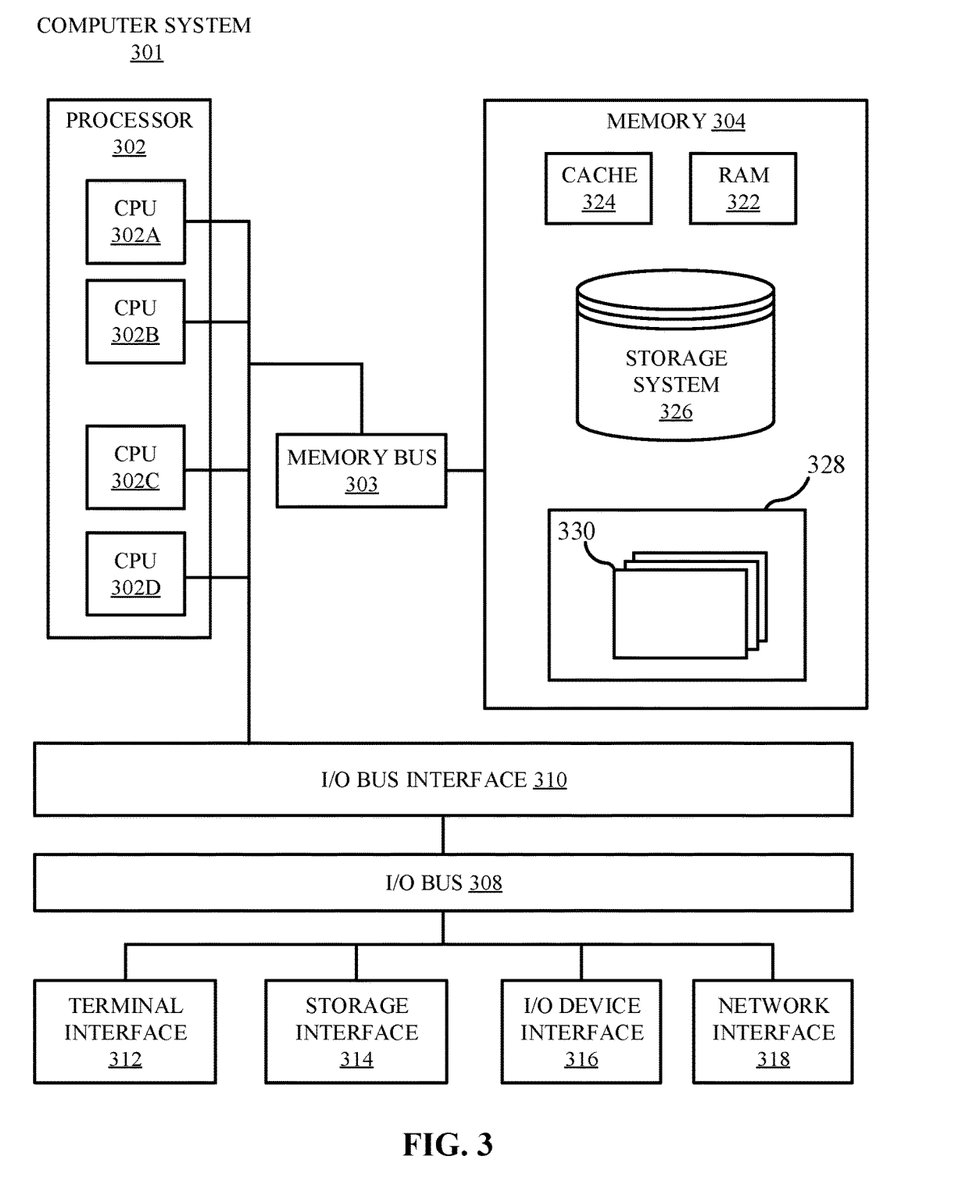
FIG. 3 is a simplified block diagram illustration of an exemplary hardware implementation of a computing system, in accordance with embodiments of the present disclosure.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 314, an I/O (Input/Output) device interface 316, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   receiving a microprocessor instruction for processing by a microprocessor; and
   processing the microprocessor instruction in a multi-cycle operation, wherein processing the microprocessor instruction further comprises:
     acquiring, by a load-store unit of the microprocessor, a unit of data having a plurality of ordered bits during a first clock cycle;
     zeroing, after the acquiring and by the load-store unit, any of the bits that are not required for use with a predefined addressing mode;
     shifting, by the load-store unit, the unit of data by a number of bits during a second clock cycle immediately following the first clock cycle;
     placing, after the shifting and during the second clock cycle, the unit of data into a register of the microprocessor; and
     providing, after the shifting and during the second clock cycle, the unit of data to comparison logic of the microprocessor, wherein the microprocessor instruction is maintained as a single instruction in a completion table during the processing of the microprocessor instruction.

2. The method of claim 1, wherein the acquiring comprises retrieving the unit of data from memory.

3. The method of claim 1, wherein the microprocessor instruction is maintained by the microprocessor as a single instruction in an instruction queue until the microprocessor instruction is removed from the instruction queue for processing by the microprocessor.

4. The method of claim 1, wherein the zeroing is performed after the acquiring and during the first clock cycle.

5. The method of claim 1, wherein the zeroing is performed during the second clock cycle.

* * * * *